United States Patent
Maurer

[11] 4,173,393
[45] Nov. 6, 1979

[54] OPTICAL WAVEGUIDE WITH PROTECTIVE COATING

[75] Inventor: Robert D. Maurer, Painted Post, N.Y.

[73] Assignee: Corning Glass Works, Corning, N.Y.

[21] Appl. No.: 803,771

[22] Filed: Jun. 6, 1977

[51] Int. Cl.² .................. G02B 5/14; C03C 25/02
[52] U.S. Cl. ........................... 350/96.34; 65/3 B; 350/96.30; 428/388
[58] Field of Search ............ 350/96.33, 96.29, 96.30; 65/3 B; 428/388

[56] References Cited

U.S. PATENT DOCUMENTS

| | | |
|---|---|---|
| 3,019,515 | 2/1962 | Whitehurst et al. .............. 350/96.33 |
| 3,157,726 | 11/1964 | Hicks, Jr. et al. ................ 350/96.30 |
| 3,659,915 | 5/1972 | Maurer et al. .................... 350/96.30 |
| 3,711,262 | 1/1973 | Keck et al. ........................ 350/96.30 |
| 3,732,425 | 5/1973 | Ellert et al. ....................... 350/96.33 |
| 3,962,515 | 6/1976 | Dumbaugh, Jr. et al. ........ 350/96.30 |

Primary Examiner—John K. Corbin
Assistant Examiner—Stewart Levy
Attorney, Agent, or Firm—Walter S. Zebrowski; Clarence R. Patty, Jr.; Richard E. Kurtz

[57] ABSTRACT

An optical waveguide includes a core of high purity fused silica, a cladding of high purity fused silica and a protective coating of metallic glass. The protective coating is applied as a liquid which contracts more than the glass after it solidifies to place the surface of the glass cladding under compression. Because the waveguide will break only under tension, the force of compression must be overcome before the waveguide can be fractured thereby strengthening the waveguide considerably. The metallic glass coating provides further advantages of abrasion protection and the prevention of fatigue.

11 Claims, 4 Drawing Figures

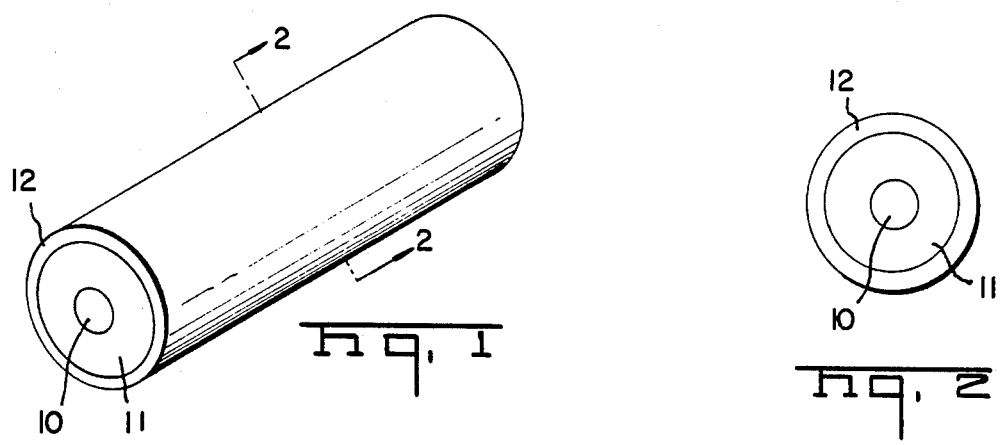
Fig. 1
Fig. 2
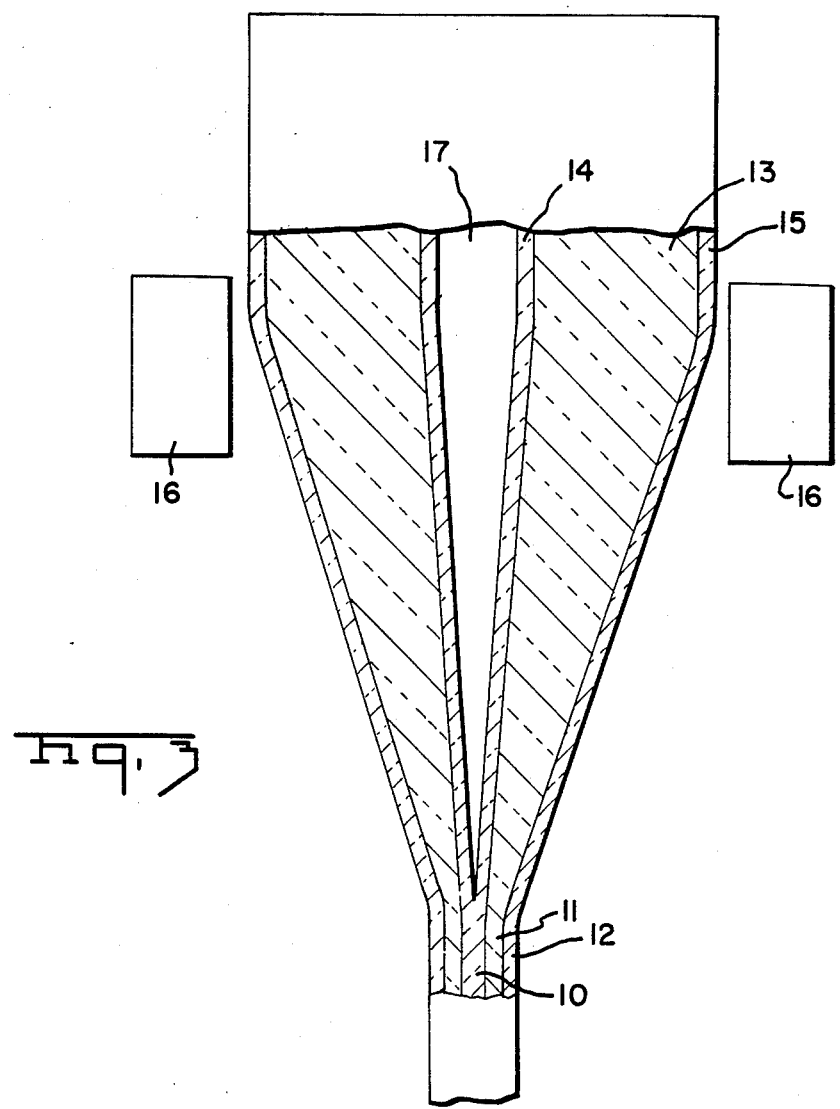
Fig. 3

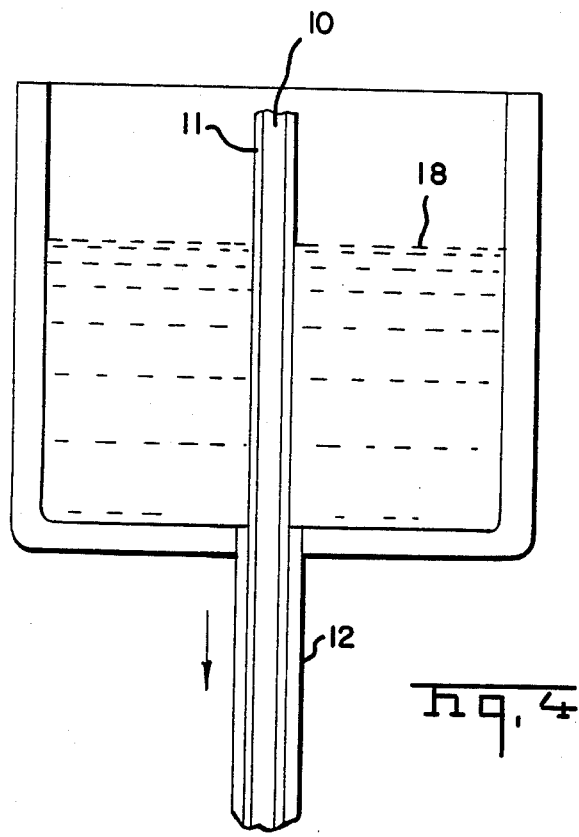

OPTICAL WAVEGUIDE WITH PROTECTIVE COATING

BACKGROUND OF THE INVENTION

This invention relates to optical waveguides and more particularly to a protective coating for such waveguides.

The increased burden on communication systems has fostered the development of high capacity systems using optical waveguides. These optical waveguides are constructed of a transparent dielectric material such as glass. They consist of a central core surrounded by a cladding having an index of refraction less than the index of refraction of the core. Light propagates along the waveguide. The theory of optical waveguides is contained in U.S. Pat. No. 3,157,726 Hicks et al and in a publication "Cylindrical Dielectric Waveguide Mode," by E. Snitzer, Journal of the Optical Society of America, vol. 51, No. 5, pp. 491–498, May 1961.

Recently, optical waveguides having very low attenuation per unit length have been developed. For example, the Maurer and Schultz, U.S. Pat. No. 3,659,915, "Glass Optical Waveguide," describes an optical waveguide comprising a cladding layer of pure fused silica or doped fused silica and a core formed of doped fused silica. The waveguides fabricated in accordance with Keck and Schultz, U.S. Pat. No. 3,711,262, are also suitable for use.

Optical waveguides require high strength for cabling processes and system installation. Waveguides often have surface flaws acquired through imperfections in the manufacturing process. Because almost all fractures start at these surface flaws, any process which improves the surface strength properties of the waveguide will also improve the overall strength. In addition, any process which prevents the introduction of surface flaws during abrasion will help preserve the strength. Fused glass waveguides fracture easily under tension because tension applied to the surface flaws causes very high stress concentration at their tips so that the intrinsic strength of the material is exceeded.

U.S. Pat. No. 3,962,515—Dumbaugh, Jr. et al describes a strengthened optical waveguide.

SUMMARY OF THE INVENTION

In accordance with this invention, a coating of metallic glass is applied around the periphery of an optical waveguide. The coating is applied as a liquid which solidifies when it cools to room temperature. When the metallic glass coating cools, it contracts thereby placing the surface of the waveguide under compression. When a waveguide is placed under compression, it is strengthened considerably against fracture. In order to fracture the waveguide, the compression force must be overcome. Only after the waveguide is placed under tension can it be fractured.

The metallic glasses are particularly suitable for use as protective coatings because they are compatible with the required high cooling rate, because they form a good moisture barrier, because they have a high yield point and because they possess the necessary toughness.

The foregoing and other objects, features and advantages of the invention will be better understood from the following more detailed description and appended claims.

DESCRIPTION OF THE DRAWINGS

FIG. 1 shows the optical waveguide of this invention;
FIG. 2 is a section on the line 2—2 of FIG. 1;
FIG. 3 depicts the process of heating and drawing the waveguide during the fabrication of the waveguide; and
FIG. 4 depicts a liquid bath for applying the metallic glass coating.

DESCRIPTION OF THE PREFERRED EMBODIMENT

Referring to FIGS. 1 and 2 an optical waveguide has a core 10 and a cladding layer 11. Pure fused silica or slightly doped silica may be used as the cladding layer 11 and fused silica doped with the necessary amount of dopant to increase the index of refraction to a desired level above that of the cladding layer is used for the core 10.

In accordance with this invention a protective coating 12 of metallic glass is formed around the periphery of the optical waveguide.

A waveguide possessing a pure fused silica cladding, and a doped fused silica core may be produced by any suitable method including but not limited to: (a) inserting a rod of fused silica, doped as required to increase the index of refraction to the desired level above that of pure fused silica, into a tube of pure fused silica, raising the temperature of the rod and tube combination until said combination has a low enough viscosity for drawing, and then drawing said rod and tube until the tube collapses around and fuses to the rod and the cross-sectional area of the combination is decreased to the desired dimension; or (b) the method set out in U.S. Pat. No. 3,711,262 "Method of Producing Optical Waveguide Fibers" by Donald B. Keck and Peter C. Schultz and assigned to a common assignee, which method comprises first forming a film of doped fused silica on the inside wall of a tube of pure fused silica, and then drawing this composite structure to reduce the cross-sectional area and to collapse the film of doped fused silica to form a fiber having a solid cross-section of the desired diameter.

FIG. 3 depicts a process of forming a waveguide with a protective metal coating in accordance with this invention.

A thick wall tube 13 of cladding glass has a thin film 14 of core glass formed on the inside wall thereof. A coating 15 of metallic glass is liquified because of the high temperature to which it is subjected.

The tube is heated by the surrounding furnace 16 until the thick walled tube 13 and core glass 14 reach a temperature at which the materials have low enough viscosity for drawing. This composite structure is then drawn until the longitudinal hole 17 collapses. The core glass 14 fills the hole 17 to form a rod including the solid core 10 surrounded by cladding layer 11 and protective coating 12.

FIG. 4 depicts a liquid bath for applying the metallic coating 15 to the waveguide rod. A waveguide having the usual core 14 and cladding 13 is drawn through a liquid bath 18 of the composition which is to form the protective coating.

The glasses suitable for use in the core and the cladding layer are well described in the referenced patents. The protective layer 12 is of glass of different chemical composition such that it has a higher thermal coefficient of expansion than the cladding layer. When the tube cools during manufacture, differential expansion places the surface of the cladding layer in compression. The metallic glass coating is in tension when it cools. Such a coating will only yield when abraded, if the forces exceed the yield point. The material for the coating must be carefully chosen so that it will place the surface of the cladding layer under compression and so that the coating itself will not be brittle and subject to fracture.

Metallic glasses are quite suitable for coating because after they solidify as they cool to room temperature they contract. The metallic glasses also have good plastic flow characteristics. These materials also have some of the highest yield points which are presently known. Some metallic glasses have yield points up to 150,000 lbs. per sq. in. In general, simple metallic glasses are made from one noble metal element (or one transition metal element) and one metalloid (B, C, Si, N, P, Ge, Sb). There are advantages in including many constituents of each type.

One example of a metallic glass suitable for use is the composition $Ni_{36}Fe_{32}Cr_{14}P_{12}B_6$. Such a glass is manufactured by Allied Chemical Company. Other metallic glasses which are suitable for use include $Fe_{803}P_{163}C_{39}B$ and $Fe_{40}Ni_{40}P_{14}B_6$ (made by Allied Chemical) or $Pd_{77}Au_5Si_{18}$; $Pd_{77}Ag_5Si_{18}$; $Pd_{77}Cu_5Si_{18}$.

Other metals can be used to coat fibers and perform the function of putting the fiber into compression. Many of these metals must be cooled at about $10^{5°}$ C./sec in order to form metallic glasses. in optical waveguide manufacture, the fiber is cooled from 2000° C. to room temperature in the order of 2 cm or less. For a typical draw speed of 2 meters/sec. this corresponds to $10^{-2}$ sec. Therefore the cooling rate is the order of $1 \times 10^{-5°}$ C./sec, as required.

Another advantage of metallic glasses is their high yield point. When the metal contracts, it is placed in tension at the same time the fiber is in compression. This tension cannot exceed the yield point (flow point) of the coating. Therefore, the high yield point of metallic glasses permits a high tension in the coating and hence a higher compression in the fiber.

The high yield point and toughness of metallic glasses permit superior coating from the use standpoint. Fibers are expected to be handled after manufacture in a way that can result in damage. The coating is incorporated to protect against this so these properties of metallic glasses permit a more effective coating.

Another major advantage of metallic glasses is their action as a barrier to moisture. Optical fibers subjected to long term stress and moisture after installation can show delayed fracture. This is due to the action of moisture at the tip of the flaws which causes them to grow. When the flaws reach the size to cause fracture under the installation stress, breakage occurs. Any coating which prevents moisture from reaching the flaws offers a significant advantage. Plastics do not offer this advantage but metals do.

Different metallic glasses and the properties of these glasses are more fully described in: J. J. Gilman, PHYSICS TODAY, May 1975, p. 46; Review Article—H. Jones—REPORTS ON PROGRESS IN PHYSICS, 36, 1425 (1973); M. Dutoit & H. S. Chen—APPLIED PHYSICS LETTERS, 23, 357 (1973); and H. S. Chen and C. E. Miller, Review of Scientific Instruments, 41, 1237 (1970).

While a particular embodiment of the invention has been shown and described, it will, of course, be understood that various modifications may be made without departing from the principles of the invention. The appended claims are, therefore, intended to cover any such modification within the true spirit and scope of the invention.

What is claimed is:

1. An optical waveguide comprising:
    a transparent glass rod having a preselected index of refraction in the core thereof and a different index of refraction at the periphery thereof, and
    a coating of metallic glass around the periphery of said rod, said metallic glass being selected from the group including: $Fe_{803}P_{163}C_{39}B$; $Fe_{40}Ni_{40}P_{14}B_6$; $Pd_{77}Au_5Si_{18}$; $Pd_{77}Ag_5Si_{18}$; and $Pd_{77}Cu_5Si_{18}$.

2. An optical waveguide comprising:
    a transparent glass rod having a preselected index of refraction in the core thereof and a different index of refraction at the periphery thereof, and
    a coating of metallic glass having a composition $Ni_{36}Fe_{32}Cr_{14}P_{12}B_6$ around the periphery of said rod.

3. An optical waveguide comprising:
    a transparent glass rod having a preselected index of refraction in the core thereof and a different index of refraction at the periphery thereof, and
    a coating of metallic glass around the periphery of said rod, said metallic glass being selected from the group consisting of at least one noble metal or transition metal and at least one metalloid.

4. The waveguide recited in claim 3 wherein said coating is applied as a liquid metal which is placed in tension when it cools to room temperature thereby making the coating yieldable only above its yield stress when abraded.

5. The waveguide recited in claim 3 wherein said glass rod includes a core and a cladding having a different index of refraction than said core.

6. The waveguide recited in claim 3 wherein said rod includes a periphery of glass having a higher index of refraction than the core of said glass rod.

7. The waveguide recited in claim 3 wherein said coating is applied as a liquid which contracts as it cools to place the surface of said tube under compression thereby strengthening it.

8. The waveguide recited in claim 7 wherein said liquid metal is heated to apply it as a coating and solidifies as it cools to room temperature.

9. The method of producing an optical fiber having improved strength comprising the steps of:
    forming a transparent glass rod having a preselected index of refraction in the core thereof and a different index of refraction at the periphery thereof, and
    coating said rod with metallic glass, said metallic glass being selected from the group consisting of at least one noble metal or transition metal and at least one metalloid.

10. The method recited in claim 9 further comprising heating the metallic glass to liquify it, and
    cooling the liquid metallic glass to solidify it, thereby placing the surface of said rod in compression because of the contraction of said liquid metallic glass after solidification.

11. The method recited in claim 9 wherein the step of forming includes:
    providing an outer glass tube,
    forming a film of core glass, having an index of refraction different than that of said glass tube, on the inside wall of said glass tube,
    heating the composite structure so formed to the drawing temperature of the materials thereof, and
    drawing the heated composite structure to reduce the cross-sectional area thereof and collapse said film of core glass to form a rod having a solid cross-sectional area.

* * * * *

UNITED STATES PATENT AND TRADEMARK OFFICE
CERTIFICATE OF CORRECTION

PATENT NO. : 4,173,393
DATED : November 6, 1979
INVENTOR(S) : Robert D. Maurer

It is certified that error appears in the above-identified patent and that said Letters Patent are hereby corrected as shown below:

PATENT

Column 3, line 28, "in" should be -- In --.

Column 4, line 34, "periphery" should be -- core --.

Column 4, line 35, "core" should be -- periphery --.

Signed and Sealed this

Third Day of June 1980

[SEAL]

Attest:

Attesting Officer

SIDNEY A. DIAMOND

Commissioner of Patents and Trademarks